(12) United States Patent
Abe et al.

(10) Patent No.: US 11,293,820 B2
(45) Date of Patent: Apr. 5, 2022

(54) PHYSICAL QUANTITY MEASUREMENT INCLUDING IMPROVED CORROSION PROTECTION

(71) Applicant: NAGANO KEIKI CO., LTD., Tokyo (JP)

(72) Inventors: Yusuke Abe, Tokyo (JP); Shuji Tohyama, Tokyo (JP); Haruhiko Sekiya, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 78 days.

(21) Appl. No.: 16/825,427

(22) Filed: Mar. 20, 2020

(65) Prior Publication Data

US 2020/0309627 A1 Oct. 1, 2020

(30) Foreign Application Priority Data

Mar. 29, 2019 (JP) .............................. JP2019-066518

(51) Int. Cl.
*G01L 9/00* (2006.01)
*G01L 19/14* (2006.01)

(52) U.S. Cl.
CPC .......... *G01L 9/0041* (2013.01); *G01L 19/143* (2013.01); *G01L 19/144* (2013.01)

(58) Field of Classification Search
None
See application file for complete search history.

(56) References Cited

U.S. PATENT DOCUMENTS

| 4,982,607 A | 1/1991 | Betterton et al. |
| 5,827,972 A | 10/1998 | Balcarek et al. |
| 2016/0091377 A1 | 3/2016 | Tohyama et al. |

FOREIGN PATENT DOCUMENTS

| EP | 3176559 A1 | 6/2017 |
| JP | H07-198517 | 8/1995 |
| JP | 2003-287472 | 10/2003 |
| JP | 2016-070813 | 5/2016 |
| JP | 2017-102011 | 6/2017 |

OTHER PUBLICATIONS

European Search Report dated Aug. 25, 2020, 8 pages.
Japanese Office Action dated Oct. 19, 2021, English translation included, 6 pages.

*Primary Examiner* — Lisa M Caputo
*Assistant Examiner* — Nigel H Plumb
(74) *Attorney, Agent, or Firm* — Rankin, Hill & Clark LLP (57) ABSTRACT

A physical quantity measuring device includes: a metallic cylindrical case; a sensor module configured to detect a physical quantity; a synthetic-resin joint provided near a first open end of the cylindrical case, the joint being attached with the sensor module and provided with an introduction port for introducing a measurement target fluid; and a cover provided near a second open end of the cylindrical case. The cover includes a locking portion for locking the sensor module. The cylindrical case includes an engagement portion provided near the first open end and engaged with the joint and a crimp portion provided near the second open end, the crimp portion configured to be plastically deformed by crimping. The cover is attached to the cylindrical case by crimping the crimp portion.

4 Claims, 5 Drawing Sheets

PHYSICAL QUANTITY MEASUREMENT INCLUDING IMPROVED CORROSION PROTECTION

The entire disclosure of Japanese Patent Application No. 2019-066518 filed Mar. 29, 2019 is expressly incorporated by reference herein.

TECHNICAL FIELD

The present invention relates to a physical quantity measuring device and a manufacturing method of the physical quantity measuring device.

BACKGROUND ART

Some of known physical quantity measuring devices include a synthetic-resin joint provided with an introduction port for receiving a measurement target fluid (see, for instance, Patent Literature 1 (JP 2017-102011 A)).

The physical quantity measuring device disclosed in Patent Literature 1, which includes the synthetic-resin joint that is in contact with the measurement target fluid, can restrain transmission of heat of the measurement target fluid to an interior of the physical quantity measuring device as compared to, for instance, a device including a metallic joint. Accordingly, even when the temperature of the measurement target fluid and/or a temperature of a target pipe is lower than an internal temperature of the physical quantity measuring device, moisture is restrained from being condensed or frozen due to the transmission of the temperature of the measurement target fluid and/or the target pipe to the interior of the physical quantity measuring device.

Further, the joint of the physical quantity measuring device according to Patent Literature 1 includes elastically deformable claws to lock the sensor module. Thus, the sensor module is kept from being detached from the joint due to the pressure of the measurement target fluid.

However, when the pressure of the measurement target fluid is higher than expected in the device of Patent Literature 1, the claws may be bent by the pressure of the measurement target fluid, so that the sensor module may be detached from the joint, possibly failing to continue the measurement.

SUMMARY OF THE INVENTION

An object of the invention is to provide a physical quantity measuring device that is provided with a synthetic-resin joint and capable of improving pressure resistance, and a manufacturing method of the physical quantity measuring device.

A physical quantity measuring device according to an aspect of the invention includes: a metallic cylindrical case; a sensor module configured to detect a physical quantity; a synthetic-resin joint disposed near a first open end of the cylindrical case, the sensor module being attached to the joint, the joint being provided with an introduction port configured to introduce a measurement target fluid to the sensor module; and a cover provided near a second open end of the cylindrical case, where the cover includes a locking portion that locks the sensor module, the cylindrical case includes an engagement portion provided near the first open end and engaged with the joint and a crimp portion provided near the second open end and configured to be plastically deformed by crimping, and the cover is attached to the cylindrical case by crimping the crimp portion.

In the above aspect of the invention, the metallic cylindrical case includes the engagement portion provided near the first open end and engaged with the joint and the crimp portion provided near the second open end and configured to be plastically deformed by crimping. The cover having the locking portion for locking the sensor module is attached to the cylindrical case by crimping the crimp portion. Accordingly, when, for instance, a high-pressure measurement target fluid is introduced into the introduction port, the pressure of the measurement target fluid acts on the cylindrical case through the sensor module and the cover that locks the sensor module. The cylindrical case, which is metallic and thus has a high strength in the above aspect of the invention, is not likely to be deformed by the pressure. In other words, the metallic cylindrical case, which has a high strength and can resist the pressure of the introduced measurement target fluid possibly having a high pressure, can prevent the detachment of the sensor module from the joint. Accordingly, the pressure resistance of the physical quantity measuring device having the synthetic-resin joint is improvable.

Since the joint that is in contact with the measurement target fluid is made of a synthetic resin in the above aspect of the invention, the temperature of the measurement target fluid and/or target pipe is not easily transmitted to the interior of the cylindrical case as compared to an instance where the joint is, for instance, metallic. Accordingly, even when, for instance, a low-temperature measurement target fluid is introduced, moisture in the cylindrical case is restrained from being condensed and/or frozen.

Further, since the joint in contact with the measurement target fluid is made of a synthetic resin in the above aspect of the invention, the joint is not corroded by the measurement target fluid even when the introduced measurement target fluid is highly corrosive.

In the physical quantity measuring device according to the above aspect of the invention, it is preferable that the cover includes a projection projecting toward the joint, and the joint includes a recess engageable with the projection at a position corresponding to the projection.

In the above arrangement, when the cover is assembled with the joint, the recess of the joint is engaged with the projection of the cover, thereby determining the position of the cover with respect to the joint. Thus, the cover is kept from being misaligned with the joint in assembling the cover with the joint, thereby facilitating the assembly process of the physical quantity measuring device.

Further, since the joint is made of a synthetic resin in the above aspect of the invention, the recess corresponding to the projection of the cover can be easily formed in the joint through die molding or the like.

In the physical quantity measuring device according to the above aspect of the invention, it is preferable that the sensor module includes a cylindrical portion and a diaphragm integrally provided on an end of the cylindrical portion, the joint includes a joint body and a projecting portion projecting from the joint body to the sensor module, and the cylindrical portion of the sensor module is attached to the projecting portion.

According to the above arrangement, the sensor module can be attached to the joint by attaching the cylindrical portion of the sensor module to the projecting portion of the joint. Accordingly, no additional process (e.g. welding) is required in attaching the sensor module to the joint, so that the assembly process of the physical quantity measuring device can be facilitated.

In the physical quantity measuring device according to the above aspect of the invention, it is preferable that the joint body includes a large-diameter portion, a small-diameter portion, and a step portion provided between the large-diameter portion and the small-diameter portion and engaged with the engagement portion, and the cover includes a cover body, and a cylindrical base provided at a base end of the cover body, the base being received at an inner circumferential side of the large-diameter portion to be held by the crimp portion.

According to the above arrangement, the base of the cover can be held by the cylindrical case by crimping the crimp portion of the cylindrical case while the base of the cover is received by the large-diameter portion of the joint and the engagement portion of the cylindrical case is engaged with the step portion of the joint. Thus, the cylindrical case can be crimped while the cover is received and stabilized by the joint, so that the assembly process of the physical quantity measuring device can be facilitated.

Further, since the joint is made of a synthetic resin in the above aspect of the invention, the large-diameter portion, the small-diameter portion, and the step portion can be easily provided through die molding or the like.

A manufacturing method according to another aspect of the invention is a method of manufacturing a physical quantity measuring device including: a metallic cylindrical case; a sensor module configured to detect a physical quantity; a synthetic-resin joint disposed near a first open end of the cylindrical case, the sensor module being attached to the joint, the joint being provided with an introduction port configured to introduce a measurement target fluid to the sensor module; and a cover provided near a second open end of the cylindrical case, the method including: attaching the sensor module to the joint; locking the sensor module with a locking portion of the cover; fitting the cylindrical case over the joint from an end of the joint; and crimping a plastically deformable crimp portion provided at a second open end of the cylindrical case to attach the cover to the cylindrical case.

The same advantages as described above can be achieved by the above aspect of the invention.

DESCRIPTION OF EMBODIMENT(S)

An exemplary embodiment of the invention will be described with reference to the attached drawings. A physical quantity measuring device 1 according to the exemplary embodiment is a pressure sensor configured to measure a pressure of a measurement target fluid flowing in a connection target.

Figure 1:
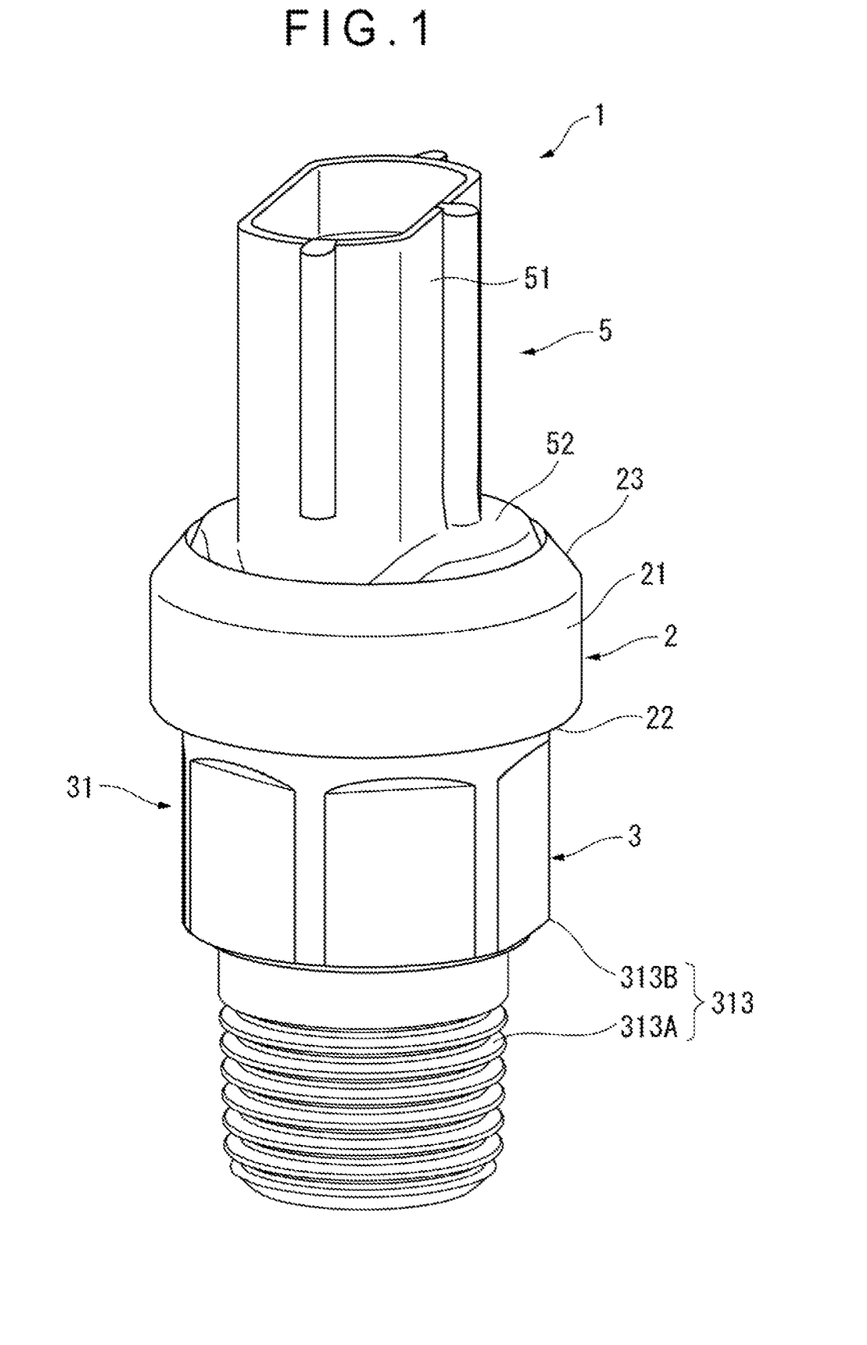
FIG. 1 is a perspective view showing an overall structure of a physical quantity measuring device according to an exemplary embodiment of the invention.
Figure 2:
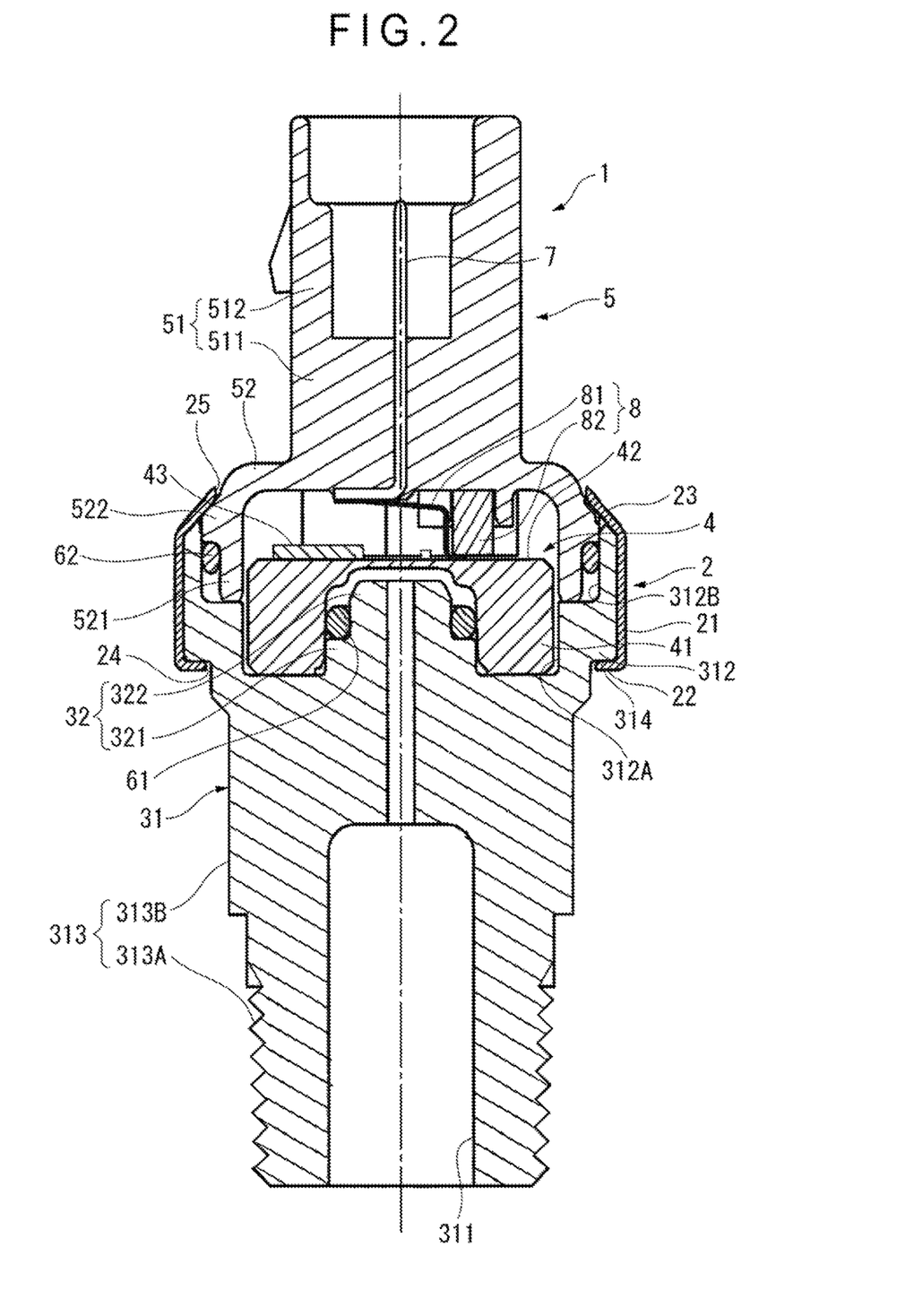
FIG. 2 is a cross-sectional view showing the overall structure of the physical quantity measuring device.
Figure 3:
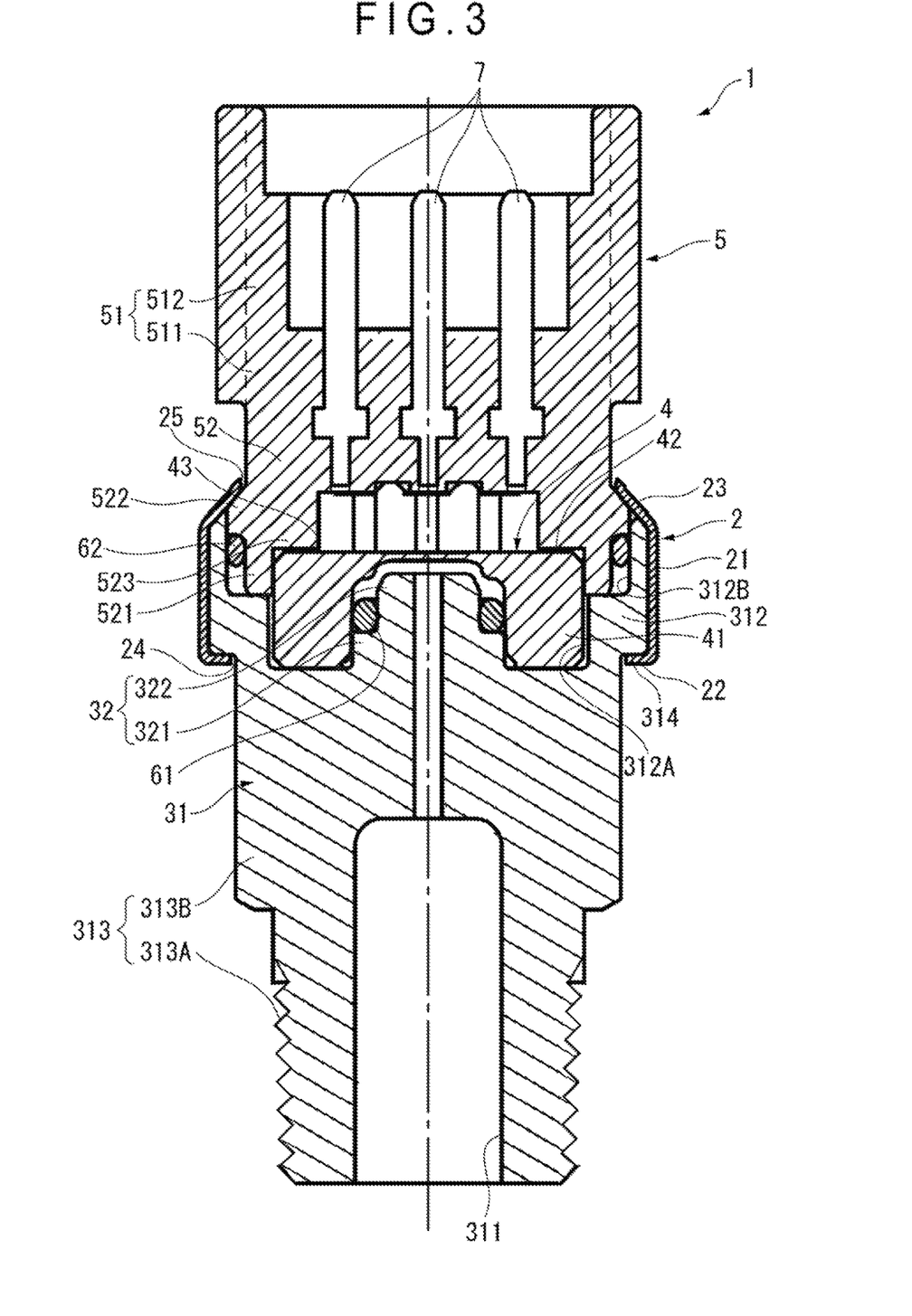
FIG. 3 is a cross-sectional view showing the overall structure of the physical quantity measuring device as viewed in a different direction.
Figure 4:
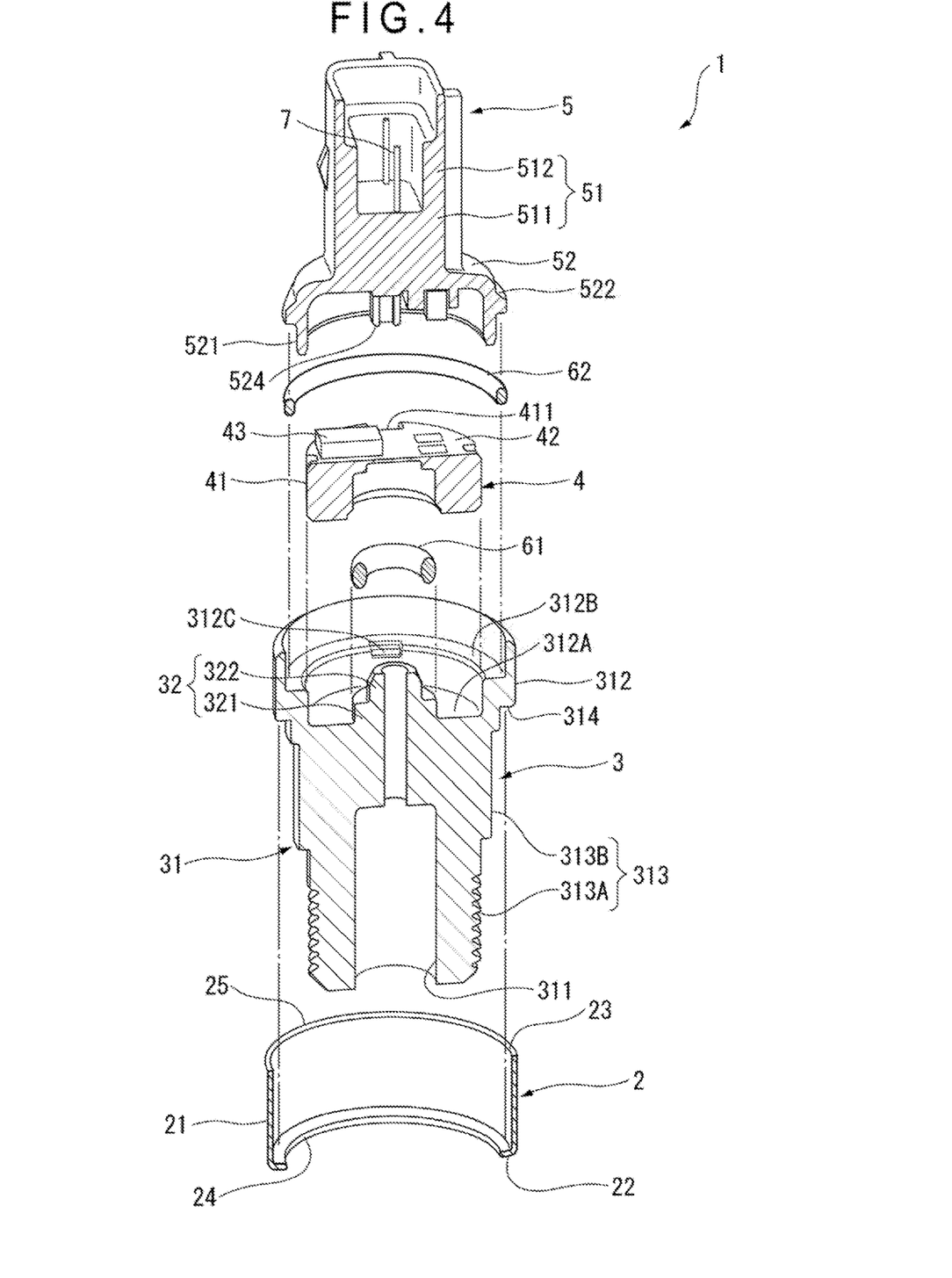
FIG. 4 is an exploded cross-sectional perspective view showing the overall structure of the physical quantity measuring device.

FIG. 1 is a perspective view showing an overall structure of the physical quantity measuring device 1 of the exemplary embodiment. FIG. 2 is a cross-sectional view showing the overall structure of the physical quantity measuring device 1. FIG. 3 is a cross-sectional view of the physical quantity measuring device 1 as viewed in a different direction from that in FIG. 2. FIG. 4 is an exploded cross-sectional perspective view showing the overall structure of the physical quantity measuring device 1.

As shown in FIGS. 1 to 4, the physical quantity measuring device 1 includes a cylindrical case 2, a joint 3, a sensor module 4, a cover 5, a first O-ring 61, a second O-ring 62, a signal transmitter 7, and a connector 8.

Cylindrical Case 2

The cylindrical case 2 is a metallic component in a form of a hollow cylinder. In the exemplary embodiment, the cylindrical case 2 is made of SUS304. The cylindrical case 2 is not necessarily made of SUS304 but may be made of any metal.

The cylindrical case 2 includes a cylindrical case body 21, an engagement portion 22, and a crimp portion 23.

The engagement portion 22 is provided near a first open end 24 of the cylindrical case 2. In the exemplary embodiment, the engagement portion 22 is formed by inwardly bending a part of the cylindrical case body 21 near the first open end 24. The engagement portion 22 is thus engageable with a later-described step portion 314 of the joint 3.

The crimp portion 23 is provided near a second open end 25 of the cylindrical case body 21. The crimp portion 23, which is plastically deformed by crimping, is configured to hold a later-described shoulder 522 of the cover 5.

Joint 3

The joint 3 is a synthetic-resin component disposed near the first open end 24 of the cylindrical case 2. In the exemplary embodiment, the joint 3 is made of PPS (PolyPhenyleneSulfide) resin. It should be noted that the joint 3 is not necessarily made of PPS resin but may be made of any synthetic resin such as, for instance, PTFE (PolyTetraFluoroEthylene) resin.

The joint 3 includes a joint body 31 and a projecting portion 32.

The joint body 31, which is a substantially cylindrical component, is provided with an introduction port 311 for introducing the measurement target fluid to the sensor module 4. Further, the joint body 31 includes a large-diameter portion 312, a small-diameter portion 313, and a step portion 314.

The large-diameter portion 312 is defined at a part of the joint body 31 near the sensor module 4. A first receiver recess 312A for receiving a later-described cylindrical portion 41 of the sensor module 4 and a second receiver recess 312B for receiving a later-described cylindrical portion 521 of the cover 5 are provided to the large-diameter portion 312. Further, the large-diameter portion 312 is provided with a third receiver recess 312C corresponding to a later-described projection 524 of the cover 5 (see FIG. 4). In the exemplary embodiment, the third receiver recess 312C includes two third receiver recesses 312C provided at opposite positions across the sensor module 4. It should be noted that the third receiver recess 312C is an example of a recess of the invention.

The small-diameter portion 313, which is provided at a side of the joint body 31 opposite the large-diameter portion 312, has a smaller outer diameter than a diameter of the large-diameter portion 312. The small-diameter portion 313 includes an external thread 313A and a tool engagement portion 313B.

The external thread 313A is configured to be connected to a connection target (not shown) through which the measurement target fluid flows. The tool engagement portion 3136 has a hexagonal profile and is engageable with a tool such as a wrench. It should be noted that the tool engagement portion 313B is not necessarily hexagonal but may be, for instance, quadrangular.

The step portion 314 is provided between the large-diameter portion 312 and the small-diameter portion 313. As described above, the step portion 314 is engageable with the engagement portion 22 of the cylindrical case 2.

The projecting portion 32 projects from the joint body 31 toward the sensor module 4. The projecting portion 32 has a first projecting portion 321 and a second projecting portion 322.

The first projecting portion 321, which projects from the joint body 31, is engageable with the later-described cylindrical portion 41 of the sensor module 4.

The second projecting portion 322 projects from the first projecting portion 321. The second projecting portion 322 has a smaller outer diameter than that of the first projecting portion 321. A first O-ring 61 is disposed on an outer circumferential surface of the second projecting portion 322. The first O-ring 61 provides a seal between the joint 3 and the sensor module 4.

Sensor Module 4

The sensor module 4 is a ceramic component and includes a cylindrical portion 41, a diaphragm 42, and an electronic component 43.

The cylindrical portion 41 is engaged with and attached to the first projecting portion 321 of the joint 3. Further, the cylindrical portion 41, which is in communication with the pressure introduction port 311 of the joint 3, is configured to receive the measurement target fluid. Two fitting grooves 411 corresponding to the later-described projections 524 of the cover 5 are provided on an outer circumferential surface of the cylindrical portion 41 at mutually opposite positions across the axial center of the sensor module 4. The projections 524 and the fitting grooves 411 are engaged to restrict the circumferential movement of the sensor module 4 with respect to the cover 5. In other words, the projections 524 serve as rotation stoppers of the sensor module 4.

The diaphragm 42 is integrally provided on an end of the cylindrical portion 41. A strain gauge (not shown) is provided on a side of the diaphragm 42 opposite the side that receives the measurement target fluid. The strain gauge is configured to detect a displacement of the diaphragm 42 to be capable of detecting the pressure of the measurement target fluid introduced through the introduction port 311.

The electronic component 43 is installed on the side of the diaphragm 42 opposite the side that receives the measurement target fluid. The electronic component 43 includes, for instance, ASIC (Application Specific Integrated Circuits) and a capacitor.

It should be noted that the sensor module 4 is not necessarily made of ceramic but may be made of, for instance, metal. Further, the sensor module 4 is not necessarily provided with the diaphragm 42, but may include any device (e.g. a so-called MEMS (Micro Electro Mechanical System) sensor) as long as the pressure of the measurement target fluid is detectable.

Cover 5

The cover 5 is a synthetic-resin component (so-called connector type component) disposed near the second open end 25 of the cylindrical case 2. In the exemplary embodiment, the cover 5 is made of PBT (PolyButyleneTerephthalate) resin. It should be noted that the cover 5 is not necessarily made of PBT resin but may be made of, for instance, PPS resin and/or PTFE resin. Further, the cover 5 may be made of metal.

The cover 5 includes a cover body 51 and a base 52.

The cover body 51 is a substantially ellipsoidal cylindrical member including a trunk portion 511 with a signal transmitter 7 being insert-molded and a hollow portion 512 integrally formed on an outer periphery of the trunk portion 511.

The base 52 includes a cylindrical portion 521, a shoulder 522, a locking portion 523, and a projection 524.

The cylindrical portion 521 is a cylindrical hollow part provided on a part of the base 52 opposite the cover body 51. As described above, the cylindrical portion 521 is received in the second receiver recess 312B of the joint 3. The second O-ring 62 is disposed on an outer circumferential surface of the cylindrical portion 521. The second O-ring 62 provides a seal between the joint 3 and the cover 5.

The shoulder 522 radially extends from the outer circumferential surface of the cylindrical portion 521. As described above, the shoulder 522 is held by the crimp portion 23 of the cylindrical case 2.

The locking portion 523, which radially extends from an inner circumferential surface of the cylindrical portion 521, locks the sensor module 4 (see FIG. 3). In the exemplary embodiment, the locking portion 523 includes two locking portions 523 provided at opposite positions across the sensor module 4. Thus, the sensor module 4 is held by the locking portion 523 and the bottom surface of the first receiver recess 312A along an axial direction of the cylindrical portion 41. Accordingly, the sensor module 4 is restricted from moving in the axial direction of the cylindrical portion 41.

The projection 524, which projects from the base 52 toward the joint 3, is engageable with the third receiver recess 312C of the joint 3. In the exemplary embodiment, the projection 524 includes two projections 524 oppositely provided across the sensor module 4, each of the projections 524 being engaged with corresponding one of the third receiver recesses 312C to restrict the circumferential movement of the cover 5 with respect to the joint 3. In other words, the position of the cover 5 with respect to the joint 3 is determined.

Signal Transmitter 7 and Connector 8

The signal transmitter 7 is a so-called end terminal made of an L-shaped metal component. In the exemplary embodiment, three signal transmitters 7 are provided. It should be noted that the number of the signal transmitter 7 is not necessarily three, but may be, for instance, two or less or four or more.

The connector 8 is a component for electrically connecting the sensor module 4 and the signal transmitter 7. The connector 8 includes an electrically conductive member 81 and an elastic member 82. The electrically conductive member 81 has first and second ends, which are connected to the sensor module 4 and the signal transmitter 7, respectively. The elastic member 82 biases the first end of the electrically conductive member 81 toward the sensor module 4.

Manufacturing Method of Physical Quantity Measuring Device 1

Next, the manufacturing method of the physical quantity measuring device 1 will be described below.

Figure 5:
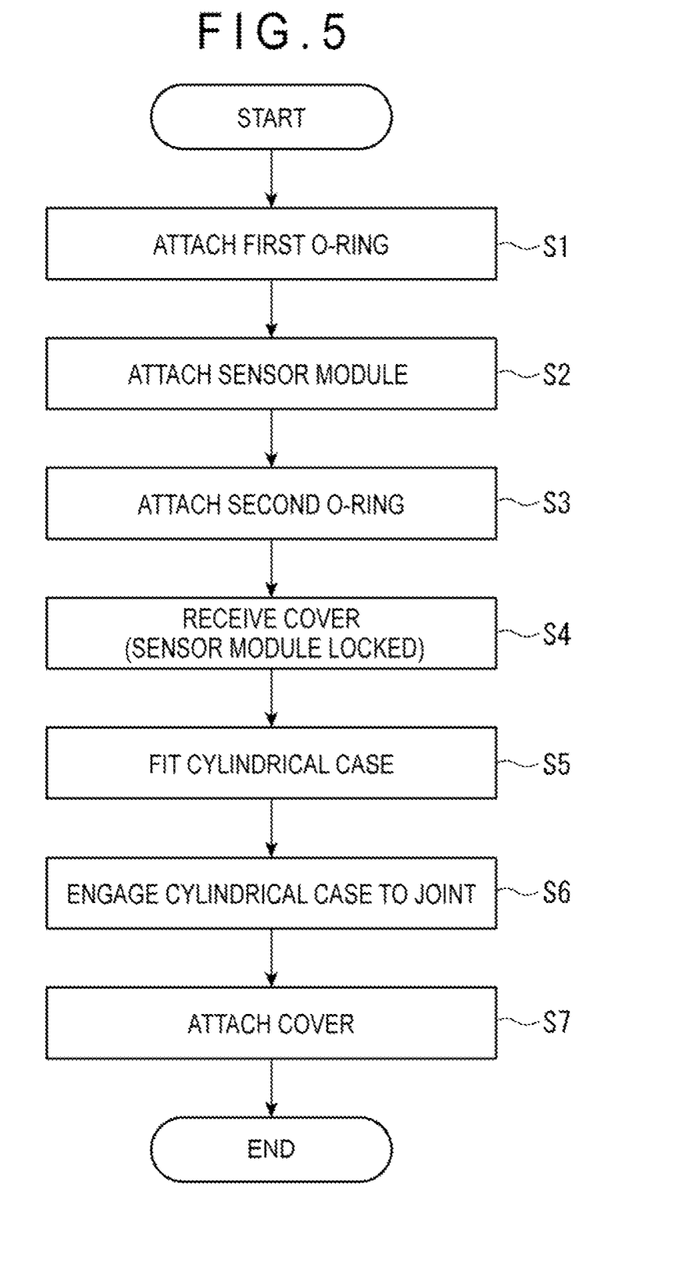
FIG. 5 is a flow chart showing a manufacturing method of the physical quantity measuring device.

FIG. 5 is a flow chart showing the manufacturing method of the physical quantity measuring device 1.

As shown in FIG. 5, the first O-ring 61 is initially attached to an outer circumferential surface of the second projecting portion 322 of the joint 3 (step S1).

Next, the sensor module 4 is attached to the joint 3 (step S2). Specifically, the cylindrical portion 41 of the sensor module 4 is engaged with the first projecting portion 321 of the joint 3 to be received in the first receiver recess 312A. At this time, the sensor module 4 is attached to the joint 3 so that the fitting grooves 411 of the cylindrical portion 41 are aligned with the third receiver recesses 312C of the joint 3.

Next, the second O-ring 62 is attached to the outer circumferential surface of the cylindrical portion 521 of the cover 5 (step S3).

Then, the cover 5 is fitted to the joint 3 (step S4). Specifically, the cylindrical portion 521 of the cover 5 is received in the second receiver recess 312B of the joint 3. Thus, the sensor module 4 is locked by the locking portion 523 of the cover 5. Further, at this time, the projection 524 of the cover 5 is engaged with the fitting groove 411 of the sensor module 4 and the third receiver recess 312C of the joint 3. The positions of the sensor module 4 and the cover 5 with respect to the joint 3 are thus determined.

Subsequently, the cylindrical case 2 is fitted over the joint 3 from an end of the joint 3 (i.e. from the side of the small-diameter portion 313) (step S5). Then, the engagement portion 22 of the cylindrical case 2 is engaged with the step portion 314 of the joint 3 (step S6).

Finally, the cover 5 is attached to the cylindrical case 2 (step S7). Specifically, while the engagement portion 22 and the step portion 314 are engaged, the crimp portion 23 of the cylindrical case 2 is crimped to hold the shoulder 522 of the cover 5 by the crimp portion 23.

The following advantages can be obtained in the exemplary embodiment.

(1) The metallic cylindrical case 2 of the exemplary embodiment has the engagement portion 22 provided near the first open end 24 and configured to be engaged with the joint 3, and the crimp portion 23 provided near the second open end 25 and configured to be plastically deformed by crimping. The cover 5 having the locking portion 523 for locking the sensor module 4 is attached to the cylindrical case 2 by crimping the crimp portion 23. Accordingly, when a high-pressure measurement target fluid is introduced into the introduction port 311, the pressure of the measurement target fluid acts on the cylindrical case 2 through the sensor module 4 and the cover 5 that locks the sensor module 4. The cylindrical case 2, which is metallic and thus has a high strength in the exemplary embodiment, is not likely to be deformed by the pressure. In other words, the metallic cylindrical case 2, which has high strength and can resist the pressure of the introduced measurement target fluid possibly having a high pressure, can prevent the detachment of the sensor module 4 from the joint 3. Accordingly, the pressure resistance of the physical quantity measuring device 1 having the synthetic-resin joint 3 is improvable.

(2) Since the joint 3 that is in contact with the measurement target fluid is made of a synthetic resin in the exemplary embodiment, the temperature of the measurement target fluid and/or target pipe is not easily transmitted to the interior of the cylindrical case 2 as compared to an instance where the joint 3 is, for instance, metallic. Accordingly, even when, for instance, a low-temperature measurement target fluid is introduced, moisture in the cylindrical case 2 is restrained from being condensed and/or frozen.

Further, since the joint 3 in contact with the measurement target fluid is made of a synthetic resin in the exemplary embodiment, the joint 3 is not corroded by the measurement target fluid even when the introduced measurement target fluid is highly corrosive.

(3) In the exemplary embodiment, in assembling the cover 5 with the joint 3, the projection 524 of the cover 5 is engaged with the third receiver recess 312C of the joint 3 to determine the position of the cover 5 with respect to the joint 3. Thus, the cover 5 is kept from being misaligned with the joint 3 in assembling the cover 5 with the joint 3, thereby facilitating the assembly process of the physical quantity measuring device 1.

Further, since the projection 524 of the cover 5 is engaged with the fitting groove 411 of the sensor module 4, the position of the sensor module 4 is also determined with respect to the joint 3. Accordingly, misalignment of the sensor module 4 with respect to the electrically conductive member 81 can be prevented, so that the electrically conductive member 81 and the sensor module 4 can be reliably connected.

Further, since the joint 3 is made of a synthetic resin in the exemplary embodiment, the third receiver recess 312C corresponding to the projection 524 of the cover 5 can be easily provided through die molding or the like.

(4) In the exemplary embodiment, the sensor module 4 can be attached to the joint 3 by attaching the cylindrical portion 41 of the sensor module 4 to the first projecting portion 321 of the joint 3. Accordingly, no additional process (e.g. welding) is required in attaching the sensor module 4 to the joint 3, so that the assembly process of the physical quantity measuring device 1 can be facilitated.

(5) In the exemplary embodiment, while the base 52 of the cover 5 is received in the large-diameter portion 312 of the joint 3, the engagement portion 22 of the cylindrical case 2 is engaged with the step portion 314 of the joint 3. Then, the crimp portion 23 of the cylindrical case 2 is crimped, whereby the cylindrical case 2 can hold the base 52 of the cover 5. Thus, the cylindrical case 2 can be crimped while the cover 5 is received and stabilized by the joint 3, so that the assembly process of the physical quantity measuring device 1 can be facilitated.

Further, since the joint 3 is made of a synthetic resin in the exemplary embodiment, the large-diameter portion 312, the small-diameter portion 313, and the step portion 314 can be easily provided through die molding or the like.

Modification(s)

It should be understood that the scope of the invention is not limited to the above-described exemplary embodiment but includes modifications and improvements as long as the modifications and improvements are compatible with an object of the invention.

Though the sensor module 4 is received by the large-diameter portion 312 of the joint 3 in the exemplary embodiment, such an arrangement is not limiting. For instance, the sensor module 4 may be received at an inner circumferential side of the tool engagement portion 313B.

Though the external thread 313A is provided on the small-diameter portion 313 of the joint 3 in the exemplary embodiment, such an arrangement is not limiting. For instance, an internal thread may be provided on an inner circumferential surface of the introduction port 311 of the joint 3. Further, the invention encompasses a measuring device without including any thread on the small-diameter portion 313. In this case, the joint may be connected through, for instance, welding to the connection target in which the measurement target fluid flows.

Though the projection 524 of the cover 5 includes the two projections 524 provided at opposite positions across the sensor module 4 in the exemplary embodiment, such an arrangement is not limiting. For instance, a single projection 524 is provided, or three or more projections 524 are provided in some embodiments. The fitting groove 411 of the sensor module 4 and the third receiver recess 312C of the joint 3 are capable of being arranged in any manner as long as the fitting groove 411 and the third receiver recess 312C are configured to mate the projection 524.

Though the electronic component 43 is installed on the diaphragm 42 in the exemplary embodiment, such an arrangement is not limiting. For instance, a circuit board is housed in the cylindrical case 2 and the electronic component 43 is installed on the circuit board in some embodiments.

Though the cover 5 is received by the joint 3 (step S4) and, subsequently, the cylindrical case 2 is fitted over the joint 3 from an end of the joint 3 (step S5) in the manufacturing method of the physical quantity measuring device 1 in the exemplary embodiment, such an arrangement is not limiting. For instance, the cylindrical case 2 is fitted over the joint 3 from the end of the joint 3 before the first O-ring 61 is attached (step S1) in some embodiments.

In the above exemplary embodiment, though the physical quantity measuring device 1 is configured to measure the pressure of the measurement target fluid, such an arrangement is not limiting. For instance, a differential pressure or a temperature is measured in some embodiments.

What is claimed is:

1. A physical quantity measuring device comprising:
a metallic cylindrical case;
a sensor module configured to detect a physical quantity;
a synthetic-resin joint disposed near a first open end of the cylindrical case, the sensor module being attached to the joint, the joint being provided with an introduction port configured to introduce a measurement target fluid to the sensor module; and
a cover provided near a second open end of the cylindrical case, wherein
the cover comprises a locking portion that locks the sensor module and a projection projecting toward the joint,
the cylindrical case comprises an engagement portion provided near the first open end and engaged with the joint and a crimp portion provided near the second open end and configured to be plastically deformed by crimping,
the cover is attached to the cylindrical case by crimping the crimp portion, and
the joint comprises a recess engageable with the projection at a position corresponding to the projection.

2. The physical quantity measuring device according to claim 1, wherein
the sensor module comprises a cylindrical portion and a diaphragm integrally provided on an end of the cylindrical portion,
the joint comprises a joint body and a projecting portion projecting from the joint body to the sensor module, and
the cylindrical portion of the sensor module is attached to the projecting portion.

3. The physical quantity measuring device according to claim 2, wherein
the joint body comprises a large-diameter portion, a small-diameter portion, and a step portion provided between the large-diameter portion and the small-diameter portion and engaged with the engagement portion, and
the cover comprises a cover body, and a cylindrical base provided at a base end of the cover body, the base being received at an inner circumferential side of the large-diameter portion to be held by the crimp portion.

4. A manufacturing method of a physical quantity measuring device comprising: a metallic cylindrical case; a sensor module configured to detect a physical quantity; a synthetic-resin joint disposed near a first open end of the cylindrical case, the sensor module being attached to the joint, the joint being provided with an introduction port configured to introduce a measurement target fluid to the sensor module; and a cover provided near a second open end of the cylindrical case, wherein the cover comprises a locking portion that locks the sensor module and a projection projecting toward the joint, the cylindrical case comprises an engagement portion provided near the first open end and engaged with the joint and a crimp portion provided near the second open end and configured to be plastically deformed by crimping, the cover is attached to the cylindrical case by crimping the crimp portion, and the joint comprises a recess engageable with the projection at a position corresponding to the projection, the method comprising:
attaching the sensor module to the joint;
locking the sensor module with the locking portion of the cover and engaging the projection of the cover with the recess of the joint;
fitting the cylindrical case over the joint from an end of the joint; and
crimping a plastically deformable crimp portion provided at a second open end of the cylindrical case to attach the cover to the cylindrical case.

* * * * *